(12) United States Patent
Chernock et al.

(10) Patent No.: US 6,813,776 B2
(45) Date of Patent: *Nov. 2, 2004

(54) METHOD FOR AUTOMATIC AND SEMI-AUTOMATIC EVENT SCHEDULING BASED ON INFORMATION EMBEDDED IN MULTIMEDIA CONTENT

(75) Inventors: Richard Steven Chernock, Newtown, CT (US); Frank Andre Schaffa, Hartsdale, NY (US); David Israel Seidman, New York, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,382

(22) Filed: Oct. 6, 1998

(65) Prior Publication Data

US 2003/0159150 A1 Aug. 21, 2003

(51) Int. Cl.[7] .......................... H04N 5/445; H04N 5/91
(52) U.S. Cl. ............................................ 725/58; 386/83
(58) Field of Search ............................. 725/61, 39–58; 386/1, 83

(56) References Cited

U.S. PATENT DOCUMENTS

| | | | |
|---|---|---|---|
| 4,381,522 A | 4/1983 | Lambert | |
| 4,641,205 A | 2/1987 | Beyers, Jr. | |
| 4,802,038 A | 1/1989 | Oguro | |
| 4,977,455 A | 12/1990 | Young | |
| 5,589,892 A | * 12/1996 | Knee et al. | ................... 725/43 |
| 5,686,954 A | 11/1997 | Yoshinobu et al. | |
| 5,699,107 A | * 12/1997 | Lawler et al. | ................ 725/58 |
| 5,727,060 A | 3/1998 | Young | |

* cited by examiner

Primary Examiner—Andrew Faile
Assistant Examiner—Hunter Lonsberry
(74) Attorney, Agent, or Firm—Scully, Scott, Murphy & Presser; Douglas W. Cameron, Esq.

(57) ABSTRACT

The method of the present invention allows a viewer/listener to schedule a future event based on information which is embedded in a multimedia presentation, such as a promotional commercial. The viewer or the viewer's equipment, on the basis of the viewer's preferences, causes the event to be scheduled at the appropriate time. The types of events that can be scheduled include:

scheduling the reception of a future television/radio/data download program, including turning the processing device on and switching to a correct channel or station;

scheduling play of audio or visual reminders for informing of the imminent start of a scheduled program;

scheduling the recordation of future program or data imbedded in such a program on a recording device, e.g., VCR, audio recorder, computer medium recorder; and schedule the downloading of data.

34 Claims, 3 Drawing Sheets

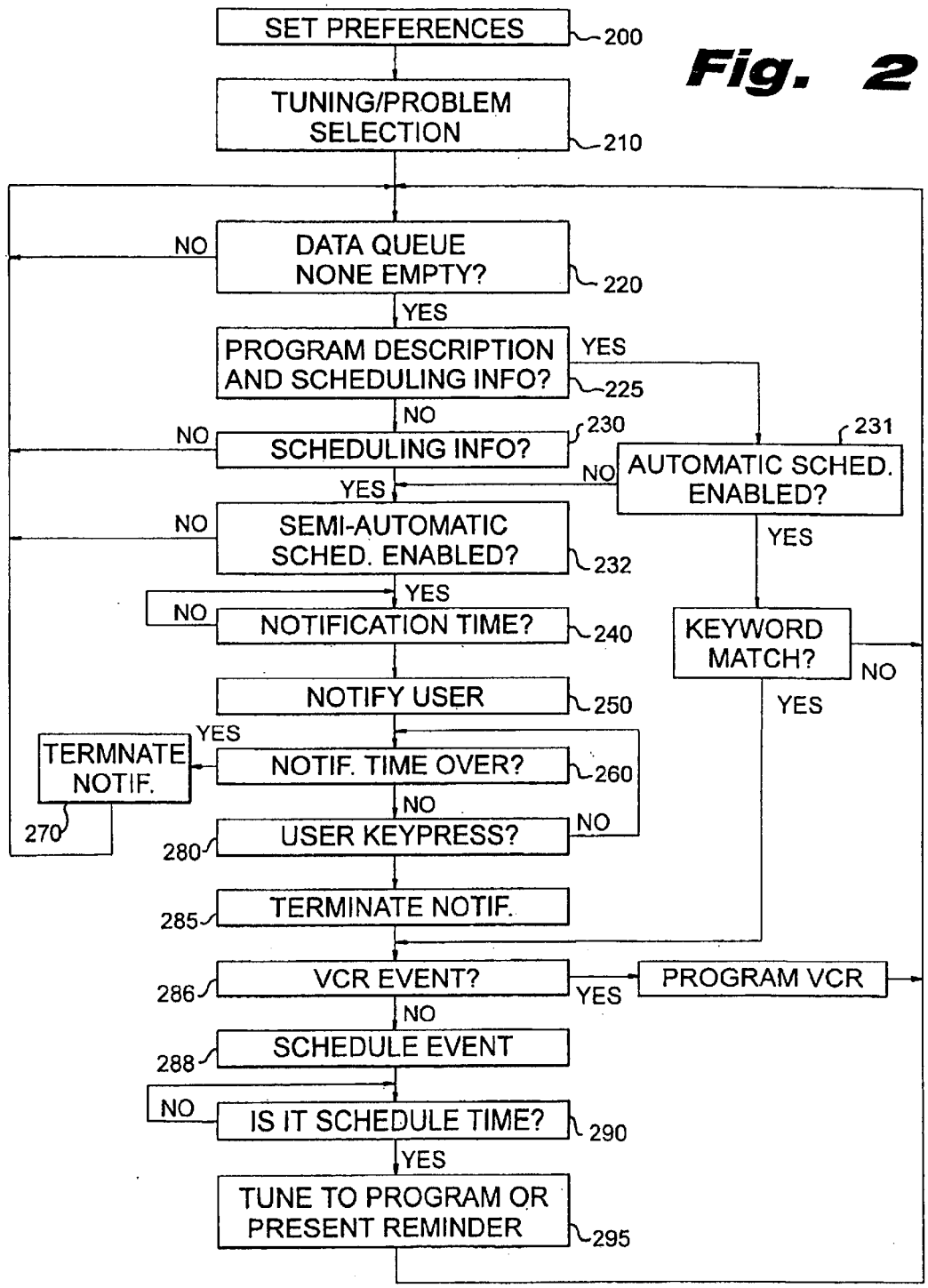

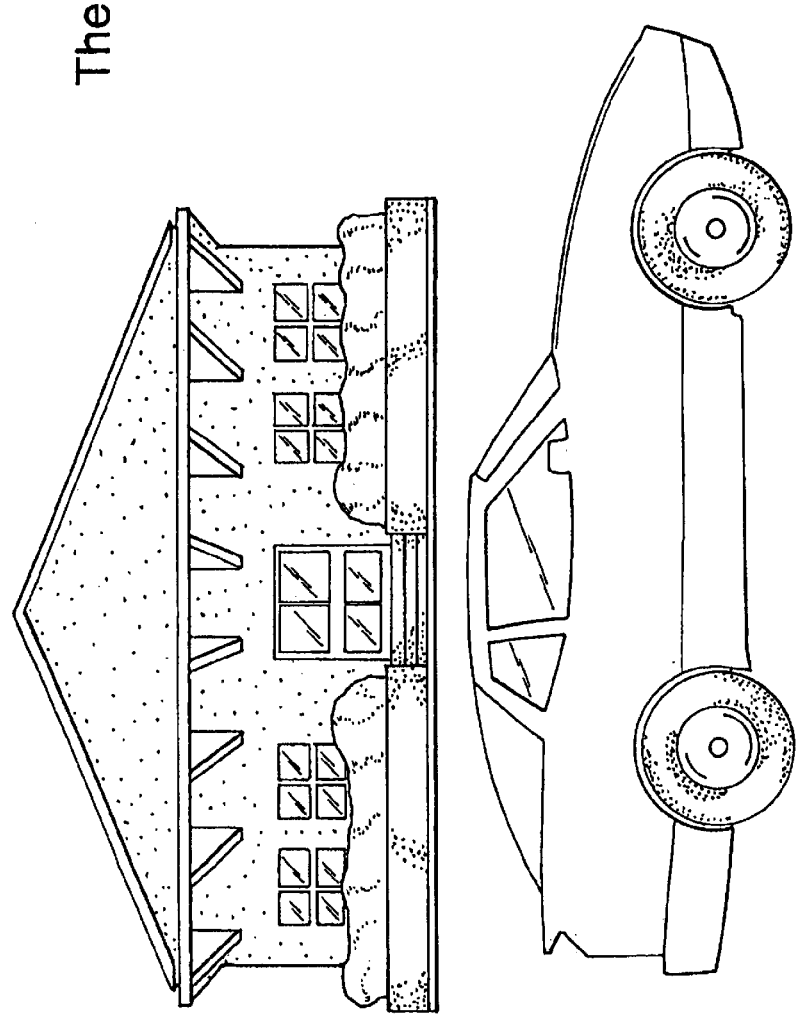

METHOD FOR AUTOMATIC AND SEMI-AUTOMATIC EVENT SCHEDULING BASED ON INFORMATION EMBEDDED IN MULTIMEDIA CONTENT

BACKGROUND OF THE INVENTION

1. Field of the Invention

The present invention is directed to viewing, listening, and downloading data in a multimedia program, and more directly to a system and method for enabling scheduling of a future viewing, listening, and data downloading event based on information presented in a current multimedia program.

2. Description of Prior Art

The current broadcast television environment is based on a scheduling concept. The content is broadcast according to a predetermined schedule. Television viewers either access content randomly, i.e., "channel surfing" or with a specific program schedule in mind. The schedule information is usually obtained from conventional means, such as printed schedules found in newspapers or from broadcast program guides. The broadcast program guides are the interactive or electronic program guides commonly included in most cable systems. The same is true for radio listeners and subscribers of the new satellite digital audio broadcasts.

Broadcasters often advertise future content through the use of promotional ads, which describe a future broadcast event. The advertisement is broadcast with the aim of attracting viewers to watch or listen to the event at the event's scheduled time. The viewers must either remember the schedule and tune to it at the appropriate time, or program a recording device to record the event.

While systems for viewer navigation through broadcast multimedia presentations are known in the art, most are based on the electronic program guide paradigm. This paradigm disconnects the program guide information from the television content i.e., audio and video, sending it as a separate entity.

The capability to include scheduling information as part of a recorded multimedia presentation is known in the art. U.S. Pat. No. 4,802,038 describes a system for recording scheduling information concerning audio events, however this system is designed for this information to be used at the recording site and not broadcast to viewers.

U.S. Pat. Nos. 4,381,522, 5,686,954, 4,977,455 and 5,727,060 describe the use of electronic program guides for allowing viewers to interactively tune to broadcast programs, typically through cursor navigation within an on-screen graphics matrix. The information that makes up the electronic program guides is broadcast as a separate stream and is not part of a multimedia presentation.

U.S. Pat. No. 4,641,205 describes a menu-driven user interface for scheduling VCR programming of a future event. However, the menu information is general and is not related to any broadcasting schedule. U.S. Pat. No. 5,307,173 describes a means for programming a VCR on the basis of compressed codes. The system described is used in VCR Plus® systems. Aside from displaying the codes on the television screen when they are entered, there is no functional linkage between the programming of the VCR and the content viewed on the television.

No means presently exist which will allow the viewer to interact with scheduling information which is provided along with the current video or audio presentation. Hence, no means presently exist to cause scheduling to occur based on a simple one-button selection from the controls of the receiving equipment, such as a remote control. Similarly, no means presently exist to cause scheduling to occur automatically without a user's current input based on user preference information which has been stored in a user's receiving device.

What is needed is a system that allows the scheduling information to be part of the multimedia presentation itself and provides an easy user interface to cause the scheduling to occur. A system is needed, that allows scheduling to occur semi-automatically under the direction of a user and assisted by embedded scheduling information, or automatically by the user's device without a user's current input.

SUMMARY OF THE INVENTION

A method is therefore provided for automatic and semi-automatic scheduling of events in the context of a multimedia presentation including audio, video and digital data. The scheduling information of a future broadcast program is ascertained and may be embedded into the content of a multimedia presentation. To enable automatic scheduling, program description information (PDI) must be embedded as well. The presentation is then displayed on the user's television set, radio, a computer or any other receiving device with capabilities of the present invention, depending on the data type.

The receiving device determines whether scheduling information was received and extracts it by setting preferences, tuning a program selection, and then repeatedly checking the data queue in anticipation of scheduling information. In the case of semi-automatic scheduling, when scheduling information is received and after waiting for an appropriate time, a user is notified of the availability of scheduling information. The notification may be performed by various means which are selectable by the user.

The user then may make a selection, by a single key press on an input device, such as a remote control, to schedule a future event. If user's equipment includes a video monitor, the selection may be made using an on-screen graphics menu. Both the notification of the user and the making of the selection by the user are performed without interrupting the presentation being played currently. The presentation itself may be a video, an audio or any other type of digital data.

In the case of automatic scheduling, the user's equipment, such as a set-top-box (STB) may perform the selection without the user's current input, on the basis of user preference information which has been pre-stored in the STB or other device. In this case, PDI, e.g., keywords such as "sports", "Lakers", or "Gary Cooper" must be embedded and transmitted along with the scheduling information.

After the selection is made, the contents of the scheduling information are processed by looping until either the notification time has passed in which case the notification is terminated and the queue monitoring is resumed, or the user has made a selection. If the user has made the selection, the notification is terminated and the process waits until the scheduled presentation time is reached.

When the scheduled presentation time is reached the following functions for "schedule execution" may be performed:

1. tuning the receiving device to play the subsequent program;
2. recording a subsequent program or its selected embedded content at the scheduled time on an external video recording medium for video, on an external audio recording medium for audio, and on internal or external digital data recording medium for other digital data; and 3. reminding the user of the scheduled event at the scheduled time, with a video or audio notification, which will allow the user to tune the STB device to play the program.

BRIEF DESCRIPTION OF DRAWINGS

The foregoing objects and advantages of the present invention may be more readily understood by one skilled in the art with reference being made to the following detailed description of a preferred embodiment thereof, taken in conjunction with the accompanying drawings wherein like elements are designated by identical reference numerals throughout the several views, and in which:

FIG. 2 is a program flow diagram of a method for event scheduling based on information embedded in the multimedia content.

FIG. 3 is a display of a multimedia presentation which includes scheduling information for viewer notification, showing a scheduling icon.

DETAILED DESCRIPTION OF THE INVENTION

Preferred Embodiment

Figure 1:
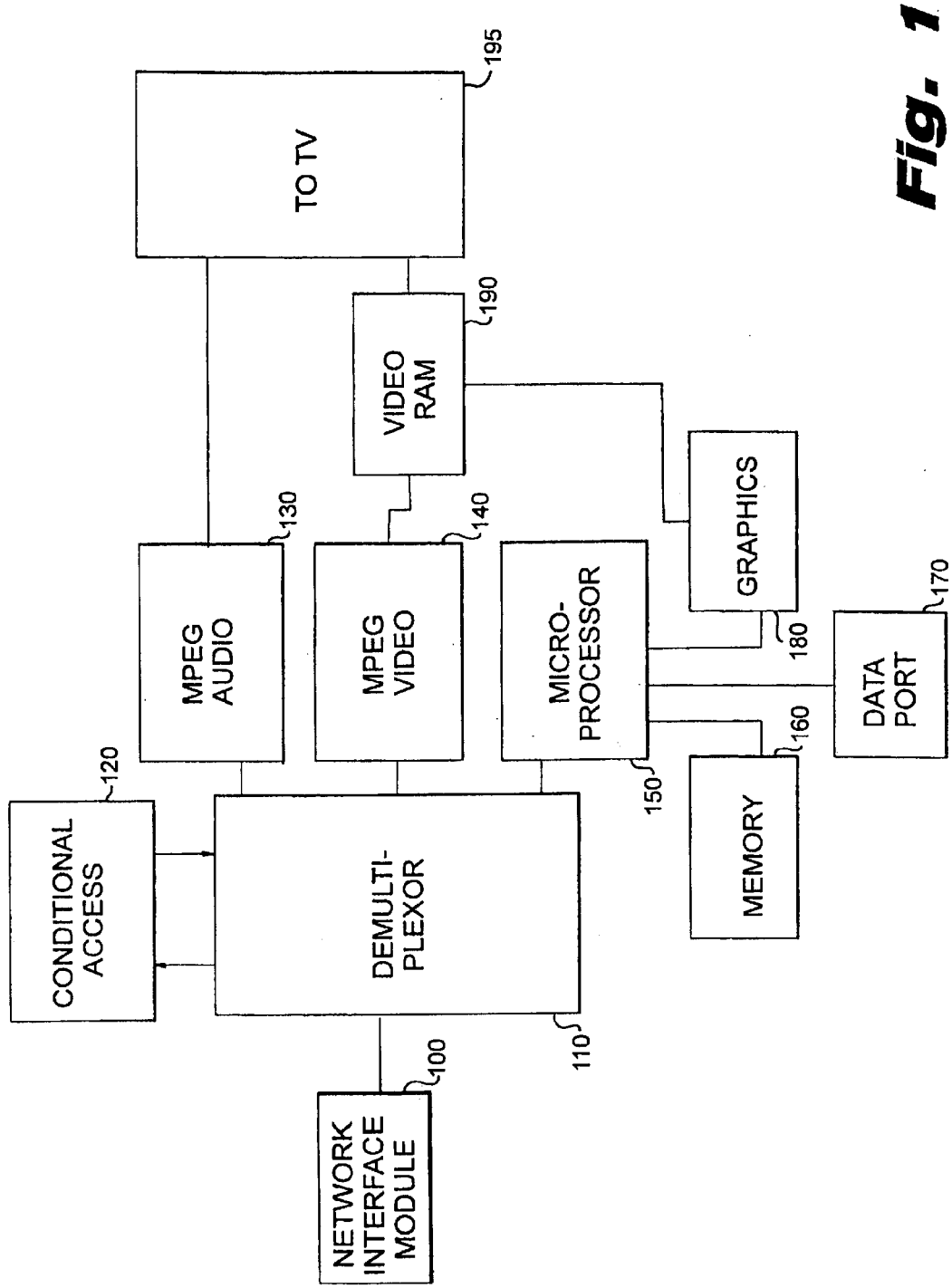
FIG. 1 is a block diagram of component interaction in an STB.

In one embodiment the present invention is used in a broadcast television or broadcast video system. In another embodiment the present invention is used in a video-on-demand system. In yet another embodiment the present invention is used in an Internet streaming video system. In still another embodiment the present invention is used in a CD-ROM or Digital Versatile Disk video system.

Authoring

In order to supply the scheduling information about future presentations for automatic and semi-automatic scheduling, the scheduling information must be inserted into the multimedia presentation. To enable automatic scheduling, PDI must be embedded as well. In the preferred embodiment, this is done offline, through the use of an authoring system designed for this marking process and described in U.S. patent application Ser. No. 09/032,491.

The scheduling information may also be added by the broadcaster in real time, while a multimedia presentation is in progress, by specifying the scheduling information to the user equipment, such as a Set-Top Box (STB) or, a digital television. The STB will use this information to notify the user about the future program, e.g., News at 11:00 P.M. on channel 4 or a sports program at 6:00 P.M. on channel 12. The choice of notification can be based on information already stored in the STB.

The authoring system accepts as input video/audio content and scheduling information about a future content. An author steps through the present content inserting the scheduling information at appropriate locations. The present invention can be implemented for digital or analog transmission systems carrying video, audio, programs or any other data content.

For digital video streams, the Motion Pictures Experts Group (MPEG-2) compression for audio and video signals, and MPEG-2 Systems transport for the transport of those signals may be used. Because of the high bit rate requirements of digital video, a compression method is usually applied to a video before transmission over a network. In the preferred embodiment, video and audio content are compressed using MPEG-2 compression, as specified in ISO/IEC 13818-2 for video and ISO/IEC 138183-3 for audio.

The MPEG-2 standard also specifies how presentations consisting of audio and video elementary streams can be multiplexed together in a "transport stream". This is specified in the MPEG-2 Systems Specification, ISO/IEC 13818-1. The MPEG-2 Systems Specification accommodates the inclusion in a presentation's transport stream of non-video and non-audio streams, by use of "private data" streams. All transport stream packets, regardless of content, are of a uniform size (188 bytes) and format. "Program-Specific Information", which is also carried in the transport stream, carries the information regarding which elementary streams have been multiplexed in the transport stream, what type of content they carry, and how they may be demultiplexed. In this embodiment, the control information is carried in an MPEG-2 Transport Stream private data stream for digital video and audio.

After inserting the scheduling and program description information, the presentation together with such scheduling and program description information may be transported to the user's STB by being sent a. in the video blanking interval of an analog video signal and extracted by the user's equipment in a manner similar to that used for closed-caption information;

b. in a separate Vestigial Side Band channel;

c. within a digital stream, and extraction of embedded data is performed by the user's equipment in a manner similar to that used for the extraction of video, audio and other digital streams.

STB

The receiving device, in the preferred embodiment, is an STB or a PC with a TV tuner card.

Shown in FIG. 1 are the specialized hardware components for utilizing MPEG-2 compressed multimedia presentations of STBs and digital televisions. A MPEG-2 demultiplexor 110 accepts the compressed video and audio MPEG-2 stream from the Network Interface Module 100, breaks the stream into its components, and directs these components to the appropriate handling function video decoder 140, audio decoder 130 or microprocessor 150. The conditional access component 120 regulates the demultiplexor 110 processing.

General-purpose microprocessors 150, such as the PowerPC 401 are used in STBs and digital televisions for controlling MPEG-2 components as well as for executing applications such as a program guide used by the viewer. The microprocessor can obtain input from the MPEG-2 stream through the demultiplexor 110 or from a viewer interaction device, such as an infrared remote control connected to a data port 170. The microprocessor 150 has an attached memory storage 160, which is either a random access memory (RAM), non-volatile storage or both.

A graphics generator 180 is connected to the microprocessor to create an on-screen display (OSD), which is merged with the output of the video decoder 140 in the Video RAM 190. The OSD generation may be a function of the video decoder itself. The resulting output from the audio decoder 130 and the Video RAM 190 is then forwarded to a monitor with speakers 195 for playback.

Processing

FIG. 2 shows the program flow of the preferred embodiment. At device initialization, a setup option step 200 allows the viewer to define characteristics of the automatic scheduling. These characteristics may include options for notification and for schedule execution, as well as whether automatic scheduling is enabled. The preferred embodiment would present these options to the viewer through the use of on-screen graphic menus. The options chosen by the viewer would be stored in memory 160 (FIG. 1).

Options for notification define how the viewer is notified that scheduling information is included in the multimedia presentation. For instance, a scheduling icon 300 (FIG. 3), may be displayed on the user receiving device, e.g., a video monitor screen or, an audio notification may be initiated. Options for schedule execution define what will happen at the scheduled time and include automatic tuning to the multimedia presentation, textual reminder overlaid on the screen, audio reminder or programming a VCR. Once these characteristics were selected, they would become part of the viewer preferences that are stored in the non-volatile memory of the receiving device. The preferences may be modified at any time through menu interactions, and multiple viewer preference profiles may be stored and selected on a single STB. Multiple options for schedule execution may be offered to the viewer who responds to a scheduling notification.

When the viewer selects a multimedia presentation to view at step 210, the Program Specific Information is parsed to identify the elementary streams therein. In addition, the STB application resolves national vs. local tuning information, for example, resolving the local NBC network broadcast to channel 4 in the New York City area.

The application at step 220, will periodically check the data queue located in memory 160 (FIG. 1) for occupancy. When data is found in the queue, it will be extracted and examined at steps 225 and 230 to determine if it carries PDI, scheduling information, both or neither. The scheduling information may include the following parameters.

1. Presentation time: The time referenced to the Program Clock Reference (PCR) carried within the MPEG multimedia presentation stream indicating when the viewer should be notified that auto-scheduling information is available, as well as the time when the notification is no longer valid, for example at the end of the promotional video clip.
2. Schedule time: The time that the scheduled event will become effective in real-time.
3. Tuning information: How to tune to a scheduled event, including channel number, MPEG program number, etc.

PDI includes keywords describing the topic area and content of the program or data which may be scheduled. If it is present along with scheduling information, preference information is examined at step 231 to determine if automatic scheduling is enabled. If so, the PDI is examined at step 233 to compare it with keywords stored in the preference information. If there is a match, the event scheduling will commence at step 286.

If only scheduling information is found the preference information is examined at step 232 to determine if semi-automatic scheduling is enabled. If so, when the notification time arrives, as determined at step 240, the viewer will be notified at step 250, according to the manner selected in the preferences set at step 200. The viewer then has an option of pressing a single key, for example the "Enter" key on the infrared remote control, causing the scheduling information to be acted upon. The notification display will be removed either at step 285 after the viewer has selected scheduling by pressing the key at step 280 or at step 270 after ascertaining that the notification time is over and that the end of the interactive portion of the promotional video clip is reached.

If the user has selected to schedule the event, preference information is examined at step 286 to determine if it is a "VCR event", i.e., if the user has chosen to see his VCR to record events which he selects using the present invention. If so, the VCR is programmed at step 287 to record the program as indicated in the tuning information section of the scheduling information. Otherwise, after parsing the stored schedule information, the event is scheduled at step 288 by use of a timer, which timer is set in the client device to activate a tuning application at step 290 at the appropriate time for implementation of scheduled events. This event application at step 295 may comprise.

1. informing the viewer of the program starting,
2. allowing the viewer to view and/or hear the selected multimedia presentation by tuning the device to the broadcast data stream,
3. allowing the viewer to download Software/Data by demultiplexing the desired data and storing it as a file on a storage device, such as an STB hard disk drive, and
4. programming a VCR by emitting through its serial port to an "IR Blaster" device programming control information for the VCR in the form of VCR Plus® codes or native programming commands for the particular model of VCR. In this case, step 287 is executed.

Any of these mechanisms may be accompanied by an on-screen countdown or audio reminders prior to the start of the scheduled event. The selected multimedia presentation will be displayed based upon selected preferences, by:

1. tuning to the selected multimedia presentation including turning on the STB/TV if necessary;
2. providing a text/graphics reminder that the selected multimedia presentation has started, along with a "one button" quick tuning mechanism to assist the viewer in tuning to the selected multimedia presentation; and
3. providing an audible reminder that the selected multimedia presentation has started.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. A method for providing a scheduling function to the recipient of a multimedia presentation independent of any Electronic Program Guide, said method comprising steps of:

communicating program scheduling information to a multimedia broadcast processing device, said scheduling information integrated within and presented during said multimedia broadcast presentation from a broadcast location;

determining whether said program scheduling information was received at said processing device, extracting said program scheduling information if it was received, and placing said program scheduling information in a data queue;

notifying a user of availability of said program scheduling information for programming of a future presentation; said user making a selection to schedule a future program or an event according to said program scheduling information received; and processing said selection according to contents of said program scheduling information so that said Processing device automatically tunes to a selected program at a subsequent scheduled time according to a user preference, wherein program scheduling functionality is performed without need for communication back to a broadcast location.

2. The method of claim 1, further comprising a step of:

ascertaining and embedded said program scheduling information into a content of said multimedia presentation during an authoring step.

3. The method of claim 1, wherein said step of extracting further comprising the steps of:

a. setting preferences and tuning a program selection;

b. waiting until said program scheduling information has been placed on said data queue; and c. waiting until a notification time is reached.

4. The method of claim 3, wherein said steps of notifying and making a selection are performed without interrupting said multimedia presentation.

5. The method of claim 4, wherein said step of notifying is performed by various notification means, said various notifying means being selectable by said user.

6. The method of claim 5, wherein said multimedia presentation is video.

7. The method of claim 5, wherein said multimedia presentation is audio.

8. The method of claim 5, wherein said notification means includes a remote control input device, said step of making a selection is performed by a single key press on said input device.

9. The method of claim 6, wherein said step of making a selection is performed using an on-screen graphics menu.

10. The method of claim 9, wherein said step of processing further comprising following steps:

d. waiting until said notification time has passed;

e. terminating the notification of said user of availability of said program scheduling information and continuing processing at step (b);

f. determining whether said user has made said selection, if said user has not made said selection continuing processing at step (d);

g. terminating the notification of said user of availability of said program scheduling information; and h. waiting until a scheduled presentation time is reached.

11. The method of claim 10, wherein said step of processing further comprises a step of recording a subsequent program at a scheduled time according to said program scheduling information.

12. The method of claim 11, wherein said step of processing further comprises a step of recording content embedded in a subsequent program at a scheduled time according to said program scheduling information.

13. The method of claim 12, wherein said step of processing further comprises a step of reminding said user of said scheduled event at a scheduled time according to said program scheduling information.

14. The method of claim 13, wherein after said step of reminding, the step of allowing said user to tune said processing device to said scheduled program by making a current selection.

15. The method of claim 13, wherein said step of reminding is a video reminder on said processing device.

16. The method of claim 13, wherein said step of reminding is an audio reminder on said processing device.

17. The method of claim 13, wherein said step of making a current selection is performed by a single key press on said input device.

18. A computer program device readable by a machine, tangibly embodying a program of instructions executable by a machine to perform method steps for providing a semi-automatic scheduling function to audience of a multimedia broadcast presentation independent of any Electronic Program Guide, said method comprising steps of:

communicating program scheduling information to a multimedia broadcast processing device, said scheduling information integrated within and presented during said multimedia broadcast presentation from a broadcast location;

determining whether said program scheduling information was received at said processing device, extracting said program scheduling information if it was received, and placing said program scheduling information on a data queue;

notifying a user of availability of said program scheduling information for programming of a future presentation;

said user making a selection to schedule a future program or an event according to said program scheduling information received; and processing said selection according to contents of said program scheduling information so that said processing device automatically tunes to a selected program at a subsequent scheduled time according to a user preference, wherein program scheduling functionality is performed without need for communication back to a broadcast location.

19. The method of claim 18, further comprising a step of:

ascertaining and embedded said program scheduling information into a content of said multimedia presentation during an authoring step.

20. The method of claim 18, wherein said step of extracting further comprising the steps of:

a. setting preferences and tuning a program selection;

b. waiting until said program scheduling information has been placed on said data queue; and c. waiting until a notification presentation time is reached.

21. The method of claim 20, wherein said steps of notifying and making a selection are performed without interrupting said multimedia presentation.

22. The method of claim 21, wherein said step of notifying is performed by various notification means, said various notifying means being selectable by said user.

23. The method of claim 22, wherein said multimedia presentation is video.

24. The method of claim 22, wherein said multimedia presentation is audio.

25. The method of claim 22, wherein said notification means includes a remote control input device, said step of making a selection is performed by a single key press on said input device.

26. The method of claim 23, wherein said step of making a selection is performed using an on-screen graphics menu.

27. The method of claim 26, wherein said step of processing further comprising following steps:

d. waiting until said notification presentation time has passed;

e. terminating the notification of said user of availability of said program scheduling information and continuing processing at step (b);

f. determining whether said user has made said selection, if said user has not made said selection continuing processing at step (d);

g. terminating the notification of said user of availability of said program scheduling information; and h. waiting until a scheduled presentation time is reached.

28. The method of claim 27, said step of processing further comprises a step of recording a subsequent program at a scheduled time according to said program scheduling information.

29. A The method of claim 28, wherein said step of processing further comprises a step of recording content embedded in a subsequent program at a scheduled time according to said program scheduling information.

30. The method of claim 29, wherein said step of processing further comprises a step of reminding said user of said scheduled event at a scheduled time according to said program scheduling information.

31. The method of claim 30, wherein after said step of reminding, the step of allowing said user to tune said processing device to said scheduled program by making a current selection.

32. The method of claim 30, wherein said step of reminding is a video reminder on said processing device.

33. The method of claim 30, wherein said step of reminding is an audio reminder on said processing device.

34. The method of claim 30, wherein said step of making a current selection is performed by a single key press on said input device.

* * * * *